Patented Apr. 22, 1941

2,239,232

UNITED STATES PATENT OFFICE 2,239,232

PRODUCTION OF MONOALDEHYDE-KETONE ALDOL CONDENSATES

Hendrik Willem Huyser, Amsterdam, Netherlands, assignor to Shell Development Company, San Francisco, Calif., a corporation of Delaware No Drawing. Application November 7, 1939, Serial No. 303,311. In the Netherlands November 15, 1938

16 Claims. (Cl. 260—594)

This invention relates to a process for converting dialdehyde-ketone aldol condensates into monoaldehyde-ketone aldol condensates. By the term "monoaldehyde-ketone aldol condensates" is meant the ketol which results from aldol condensation of one molecule of an aldehyde with one molecule of a ketone while the term "dialdehyde-ketone aldol condensate" refers to the ketol from two molecules of aldehyde and one molecule of ketone. They are designated "aldol" condensates to distinguish them from unsaturated products resulting from crotonaldehyde type of condensation reactions.

It is well known to the art that monoaldehyde-ketone aldol condensates may be produced by condensing an aldehyde with a ketone, this reaction usually being effected in the presence of an alkaline condensing agent. This condensation reaction is the initial step in the preparation of a very useful class of resins. For example, methyl ethyl ketone may be condensed with formaldehyde to give methylol butanones. The monomethylol butanone may be separated from the reaction mixture and chemically dehydrated to yield methyl isopropenyl ketone. This unsaturated ketone may then be polymerized by subjecting it to the action of light to produce a clear, colorless, hard and useful resin. Now the condensation reaction between the formaldehyde and the methyl ethyl ketone does not give a high yield of the desired intermediate product for the synthesis of the resin, the mono-methylol butanone. One of the principal reasons for the poor yield of the desired product is the formation of a by-product, dimethylol butanone, which results from the combination of two molecules of formaldehyde with one molecule of methyl ethyl ketone. Even when a large excess of methyl ethyl ketone over the formaldehyde is employed, which procedure would be expected to suppress the formation of the dimethylol butanone and favor the yield of mono-methylol butanone, the dimethylol butanone constitutes a very appreciable percentage of the reaction products. The dimethylol butanone which always appears as a by-product of the condensation reaction is unsuitable for the production of the resin and, therefore, in this respect, it is an undesirable by-product.

It is an object of the present invention to provide a simple and economical process for converting a dialdehyde-ketone aldol condensate into a monoaldehyde-ketone aldol condensate. Another object of the invention is to provide a method for improving the yield of monoaldehyde-ketone aldol condensate which is obtainable by condensing aldehydes with ketones.

I have now found that dialdehyde-ketone aldol condensates may be converted to monoaldehyde-ketone aldol condensates by reacting the dialdehyde-ketone aldol condensate with a ketone either in the presence or absence of an alkaline condensing agent. This discovery is of great utility because it provides a means for obtaining practically complete conversion of aldehydes and ketones into the monoaldehyde-ketone aldol condensates.

The reaction which is involved in the process of the invention may be illustrated by that which occurs when dimethylol butanone, the undesirable by-product from the condensation of formaldehyde with methyl ethyl ketone, reacts with methyl ethyl ketone according to the following equation:

$$CH_3C(CH_2OH)_2COCH_3 + CH_3CH_2COCH_3 \rightarrow$$
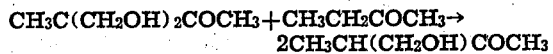
$$2CH_3CH(CH_2OH)COCH_3$$

The dimethylol butanone used as starting material may be a substantially pure substance such as might be obtained by distilling the mixture of products from the condensation of the formaldehyde with the butanone. It is not, however, essential that such a pure material be used, since excellent results may be obtained by employing the residue after removal of the unreacted components in the mixture and the mono-methylol butanone.

The reaction between the dimethylol butanone and butanone may be effected by heating the mixture of reactants when no catalyst or condensing agent is utilized, the reaction ordinarily being too slow for practical purposes at ordinary temperatures. By employing a condensing agent, the rate of the reaction is considerably increased so that it will occur at a practical rate at ordinary temperatures. If desired, however, elevated temperatures may be used. For example, the normal boiling temperature of the reaction mixture is often convenient, although higher temperatures may also be used with the aid of elevated pressures which are sufficient to keep the reactants substantially in the liquid phase.

Any basic-acting condensing agent may be employed as catalyst in the process. Thus there may be used strong bases such as the hydroxides of alkali and alkaline earth metals including sodium hydroxide, potassium hydroxide, calcium hydroxide, barium hydroxide. These strong bases give the best results when they are used in the form of reasonably dilute solutions in solvents such as water or alcohol which are inert to the reactants and act as diluents in the reaction mixture. Basic-acting salts may also be used, such as potassium or sodium carbonates, disodium or dipotassium phosphates, trisodium or tripotassium phosphates, borax and the like. Organic bases are also suitable, such as tri-alkyl amines and quaternary bases like tetramethylammonium hydroxide, tetramethyl sulphonium hydroxide, etc.

It is ordinarily preferable to employ a molecular excess of methyl ethyl ketone over the dimethylol butanone in the reaction mixture during execution of the process. This procedure leads to the formation of the highest yields of the desired mono-methylol butanone. The mono-methylol butanone may be obtained, however, with equimolecular amounts of the reactants or even an excess of the dimethylol butanone.

While the process of the invention has been described in considerable detail with special reference to the reaction between dimethylol butanone and methyl ethyl ketone, this has been done only for purposes of convenience. The invention broadly contemplates the reaction of any dialdehyde-ketone aldol condensate with any suitable ketone to produce a monoaldehyde-ketone aldol condensate. The dialdehyde-ketone aldol condensate may be any ketol which results from the aldol condensation or direct combination of two molecules of any aldehyde with one molecule of ketone. The dialdehyde-ketone aldol condensates may be the condensation products wherein both aldehyde molecules have been linked to the same carbon atom of the ketone molecule like in dimethylol butanone or they may be products wherein the aldehyde molecules have been joined to different carbon atoms. The former are a preferred class of reactants. The reactants may be obtained by condensing any such aldehyde as formaldehyde, acetaldehyde, isobutyraldehyde, acrolein, crotonaldehyde, benzaldehyde, cyclopentyl aldehyde, furfuraldehyde, chloral, butyrchloral and the like, with any suitable ketone such as acetone, methyl ethyl ketone, diethyl ketone, methyl isobutyl ketone, propyl cyclohexyl ketone, mesityl oxide, acetophenone, chlormethyl ethyl ketone, diacetyl, acetol, and the like.

When the dialdehyde-ketone aldol condensate is reacted, according to the process of the invention, with the same ketone as that from which it is derived, the resulting product will be a monoaldehyde-ketone aldol condensate of the respective ketone. If a different ketone is employed, the product obtained will be a mixture of two different monoaldehyde-ketone aldol condensates. For example, if dimethylol acetone is reacted with methyl ethyl ketone, the product which will be obtained will be a mixture of mono-methylol acetone and monomethylol butanone. The production of such a mixture of the mono-aldehyde-ketone aldol condensates may in some cases be desirable.

Any suitable ketone may be reacted with the dialdehyde-ketone aldol condensate to yield a monoaldehyde-ketone aldol condensate. Suitable ketones are those which contain at least one hydrogen atom linked to a saturated carbon atom which is vicinal to the carbonyl group. Thus methyl tertiary butyl ketone and ethyl phenyl ketone are quite satisfactory, but ditertiary butyl ketone and diphenyl ketone are unsuitable. Examples of typical suitable ketones which may be used are those listed above.

Upon completion of the reaction, the catalyst, if one has been used, may be removed from the reaction mixture by treatment with a substance which will render it insoluble and/or substantially catalytically inactive, and the insoluble precipitate may be separated from the reaction mixture by filtration, for example. The mono-aldehyde-ketone aldol condensate may then be separated from the reaction mixture by any suitable manner, such as distillation, extraction and the like.

The following specific examples illustrate suitable modes of executing the process of the invention. The examples are for illustrative purposes, and the invention is not to be regarded as limited to the specific reactants, the conditions or the modes of operation described therein.

*Example I*

About 5.52 mols of dimethylol butanone were mixed at approximately 20° C. with 52 mols of methyl ethyl ketone, 200 cc. of an aqueous barytes solution of 3.2 percent concentration and 1500 cc. of water. After 24 hours, the barytes were converted to barium carbonate by treatment of the reaction mixture with carbon dioxide, and the carbonate was removed by filtration. The mixture was then distilled at atmospheric pressure up to a temperature of about 70° C. to remove the unreacted methyl ethyl ketone. Subsequently, the mixture was distilled in vacuo at about 14 mm. pressure, whereby water was distilled off up to a temperature of 86° C. and about 4.56 mols of mono-methylol butanone were obtained in the fraction distilling between 86° and 98° C.

*Example II*

About 132 gms. of a distillation residue, obtained by distilling off the water and excess methyl ethyl ketone and then distilling off in vacuo the mono-methylol butanone from the reaction product obtained by condensing methyl ethyl ketone and formaldehyde in the presence of an aqueous solution of barytes as catalyst, were mixed with 688 gms. of methyl ethyl ketone, 36 cc. of a 3.2 percent aqueous barytes solution and 270 cc. of water. After having been kept for about 66 hours at approximately 20° C., the catalyst was inactivated by saturating the reaction mixture with carbon dioxide and the barium carbonate filtered therefrom. Subsequently, the excess of methyl ethyl ketone and part of the water were removed by distillation at atmospheric pressure, after which the remainder of the water was removed by distillation in vacuo at 35 mm. pressure. Upon further distillation at 3 mm. pressure, about 58 gms. of monomethylol butanone were isolated.

*Example III*

About 132 gms. of the same distillation residue as in Example II were mixed with 360 gms. of methyl ethyl ketone and 5 cc. of a 25 percent caustic soda solution. After a reaction period of about 5 hours at approximately 20° C., the catalyst was precipitated with carbon dioxide and the carbonate removed by filtration. About 48 gms. of mono-methylol butanone were isolated by distillation of the mixture in a fraction boiling from about 60° C. at 2 mm. pressure.

I claim as my invention:

1. A process for the production of mono-methylol butanone which comprises reacting dimethylol butanone with methyl ethyl ketone in the presence of barium hydroxide.

2. A process for the production of monomethylol butanone which comprises reacting dimethylol butanone with methyl ethyl ketone in the presence of sodium hydroxide.

3. A process for the production of monomethylol butanone which comprises reacting dimethylol butanone with methyl ethyl ketone in the presence of a basic-acting condensing agent.

4. A process for the production of monomethylol butanone which comprises reacting dimethylol butanone with methyl ethyl ketone.

5. A process for the production of a monoalkylol ketone which comprises reacting a dialkylol ketone with a ketone containing at least one hydrogen atom linked to a saturated carbon atom vicinal to the carbonyl group in the presence of a basic-acting condensing agent.

6. A process for the production of a monoalkylol ketone which comprises reacting a dialkylol ketone with a ketone containing at least one hydrogen atom linked to a saturated carbon atom vicinal to the carbonyl group.

7. A process for the production of a monoaldehyde-ketone aldol condensate which comprises reacting a dialdehyde-ketone condensate with a ketone containing at least one hydrogen atom linked to a saturated carbon atom vicinal to the carbonyl group in the presence of barium hydroxide and an inert liquid diluent.

8. A process for the production of a monoaldehyde-ketone aldol condensate which comprises reacting a dialdehyde-ketone condensate with a ketone containing at least one hydrogen atom linked to a saturated carbon atom vicinal to the carbonyl group in the presence of barium hydroxide.

9. A process for the production of a monoaldehyde-ketone aldol condensate which comprises reacting a dialdehyde-ketone condensate with a ketone containing at least one hydrogen atom linked to a saturated carbon atom vicinal to the carbonyl group, in the presence of sodium hydroxide and an inert liquid diluent.

10. A process for the production of a monoaldehyde-ketone aldol condensate which comprises reacting a dialdehyde-ketone condensate with a ketone containing at least one hydrogen atom linked to a saturated carbon atom vicinal to the carbonyl group in the presence of sodium hydroxide.

11. A process for the production of a monoaldehyde-ketone aldol condensate which comprises reacting a ketone containing at least one hydrogen atom linked to a saturated carbon atom vicinal to the carbonyl group, with the distillation residue remaining after removal of the monoaldehyde-ketone aldol condensate and lower-boiling constituents from the reaction products obtained by condensing a ketone and an aldehyde, said reaction being effected in the presence of a basic-acting condensing agent.

12. A process for the production of a monoaldehyde-ketone aldol condensate which comprises reacting a ketone containing at least one hydrogen atom linked to a saturated carbon atom vicinal to the carbonyl group, with the distillation residue remaining after removal of the monoaldehyde-ketone aldol condensate and lower-boiling constituents from the reaction products obtained by condensing a ketone and an aldehyde.

13. In a process for the production of a monoaldehyde-ketone aldol condensate by condensing a ketone and an aldehyde, the improvement which comprises reacting a ketone containing at least one hydrogen atom linked to a saturated carbon atom vicinal to the carbonyl group, with the distillation residue remaining after removal of the monoaldehyde-ketone aldol condensate and lower-boiling constituents from the reaction products obtained by the condensation of the ketone with the aldehyde, said reaction being effected in the presence of a basic-acting condensing agent.

14. In a process for the production of a monoaldehyde-ketone aldol condensate by condensing a ketone and an aldehyde, the improvement which comprises reacting a ketone containing at least one hydrogen atom linked to a saturated carbon atom vicinal to the carbonyl group, with the distillation residue remaining after removal of the monoaldehyde-ketone aldol condensate and lower-boiling constituents from the reaction products obtained by the condensation of the ketone with the aldehyde.

15. A process for the production of a monoaldehyde-ketone aldol condensate which comprises reacting a dialdehyde-ketone condensate with a ketone containing at least one hydrogen atom linked to a saturated carbon atom vicinal to the carbonyl group in the presence of a basic-acting condensing agent.

16. A process for the production of a monoaldehyde-ketone aldol condensate which comprises reacting a dialdehyde-ketone condensate with a ketone containing at least one hydrogen atom linked to a saturated carbon atom vicinal to the carbonyl group.

HENDRIK WILLEM HUYSER.